US011061851B2

(12) United States Patent
Morishita et al.

(10) Patent No.: US 11,061,851 B2
(45) Date of Patent: Jul. 13, 2021

(54) COMPUTER SYSTEM, PROCESSING METHOD, AND DRIVER PROGRAM

(71) Applicant: HITACHI, LTD., Tokyo (JP)

(72) Inventors: Noboru Morishita, Tokyo (JP); Masakuni Agetsuma, Tokyo (JP); Akihiko Araki, Tokyo (JP); Tomoki Sekiyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/083,059

(22) PCT Filed: Jul. 28, 2016

(86) PCT No.: PCT/JP2016/072111
§ 371 (c)(1),
(2) Date: Sep. 7, 2018

(87) PCT Pub. No.: WO2018/020630
PCT Pub. Date: Feb. 1, 2018

(65) Prior Publication Data
US 2019/0095382 A1 Mar. 28, 2019

(51) Int. Cl.
*G06F 15/167* (2006.01)
*G06F 9/48* (2006.01)
(Continued)

(52) U.S. Cl.
CPC ............ *G06F 15/167* (2013.01); *G06F 3/061* (2013.01); *G06F 3/067* (2013.01); *G06F 3/0644* (2013.01);
(Continued)

(58) Field of Classification Search
CPC .......... G06F 15/167; G06F 3/061; G06F 9/48; H04L 41/24; H04L 67/1097
See application file for complete search history.

(56) References Cited

U.S. PATENT DOCUMENTS 8,799,592 B2* 8/2014 Bayer .................. G06F 3/0664
711/154
9,003,081 B2* 4/2015 Kudo ..................... G06F 3/067
710/40
(Continued)

FOREIGN PATENT DOCUMENTS

JP 2000-029850 A 1/2000
JP 2005-157830 A 6/2005
JP 2016-053946 A 4/2016

OTHER PUBLICATIONS

International Search Report of PCT/JP2016/072111 dated Sep. 20, 2016.

*Primary Examiner* — Philip C Lee
(74) *Attorney, Agent, or Firm* — Mattingly & Malur, PC

(57) ABSTRACT

A computer system includes a plurality of servers connected to each other via a communication line, each server including a memory and a processor, an OS program and a storage program. The storage program is executed by the processor, and one of the plurality of servers acts as a request source server while one of the other servers acts as a request destination server. When the request source server reads data from the request destination server, the processor of the request source server executes the storage program to transmit a data read request to the request destination server. The processor of the request destination server then executes a storage memory driver incorporated in the OS program to read the requested data from an own memory and transmit the read data to the request source server. The request source server then executes the storage program to acquire the data.

9 Claims, 15 Drawing Sheets

(51) Int. Cl.
    *G06F 3/06*         (2006.01)
    *G06F 13/10*       (2006.01)
    *G06F 15/17*       (2006.01)
    *G06F 13/38*       (2006.01)
    *H04L 12/24*       (2006.01)
    *H04L 29/08*       (2006.01)

(52) U.S. Cl.
    CPC .......... *G06F 3/0659* (2013.01); *G06F 3/0664* (2013.01); *G06F 9/48* (2013.01); *G06F 13/102* (2013.01); *G06F 13/38* (2013.01); *G06F 15/17* (2013.01); *H04L 41/24* (2013.01); *H04L 67/1097* (2013.01)

(56) References Cited

U.S. PATENT DOCUMENTS

| | | |
|---|---|---|
| 2005/0120173 A1 | 6/2005 | Minowa |
| 2016/0062944 A1 | 3/2016 | Xiong et al. |
| 2016/0147709 A1* | 5/2016 | Franke ................ H04L 67/1097 709/212 |

* cited by examiner

[FIG. 1]
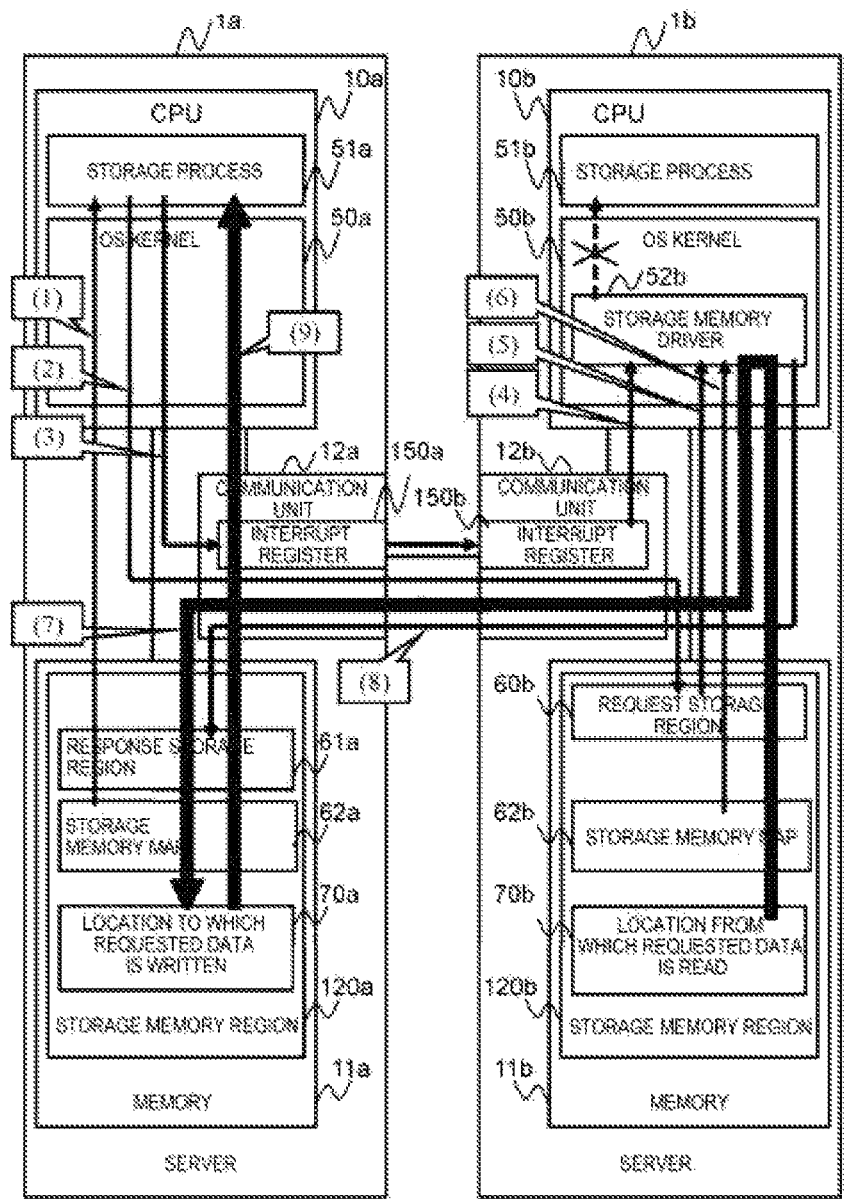

[FIG. 2]
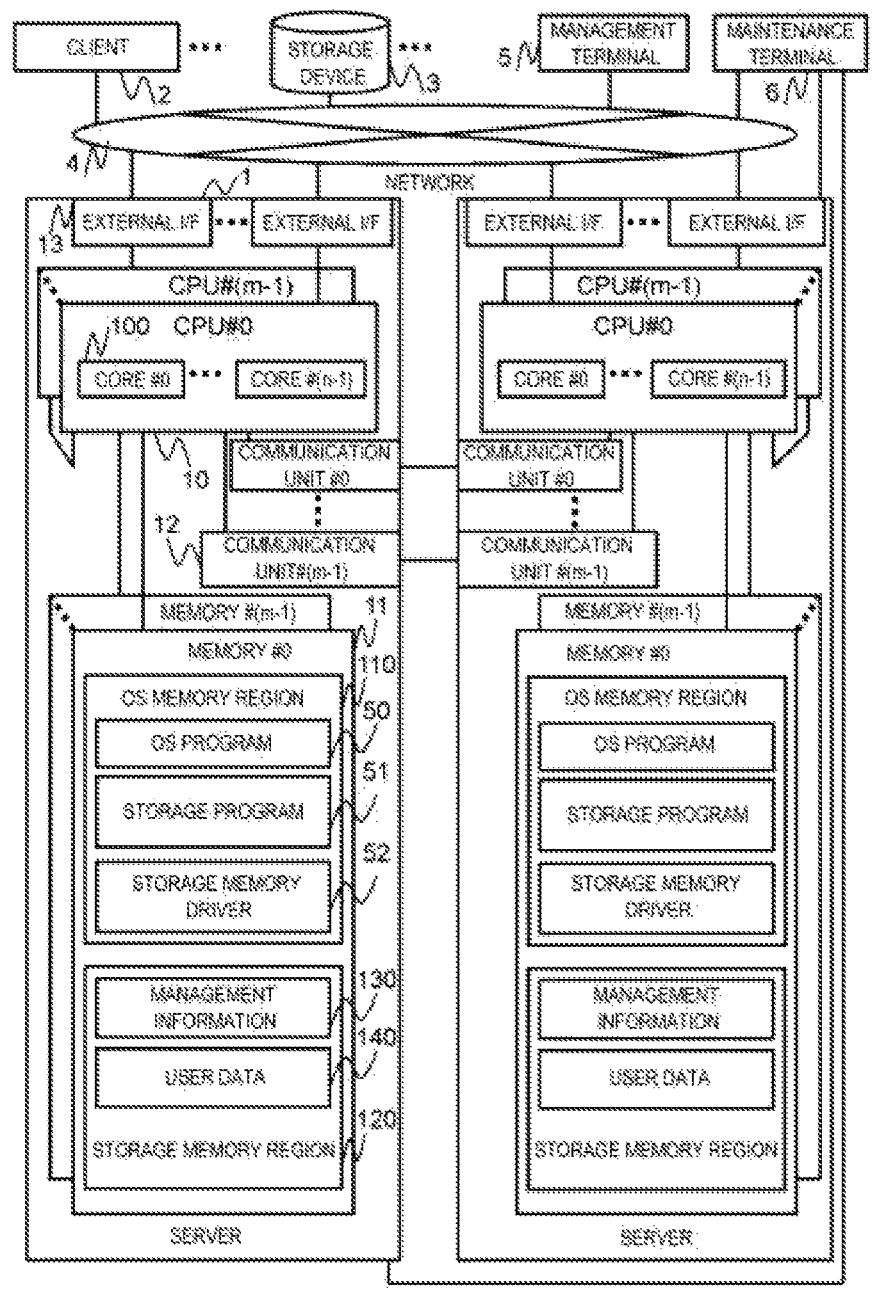

[FIG. 3]
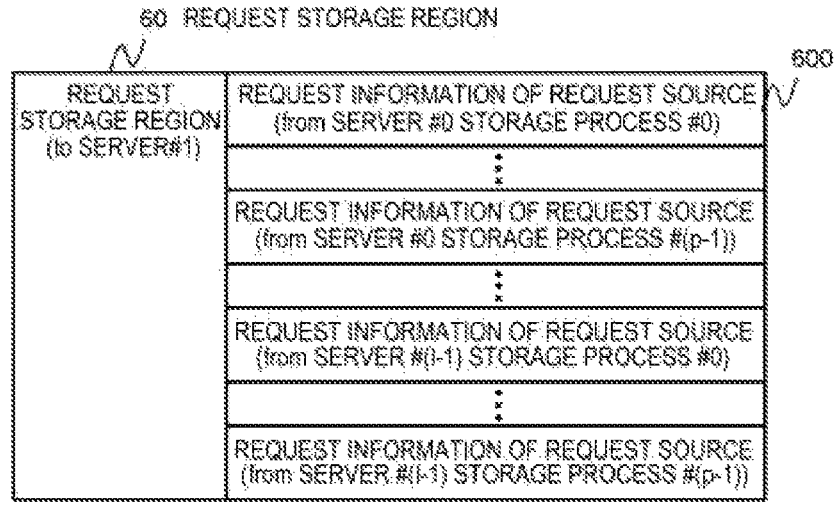
[FIG. 4]
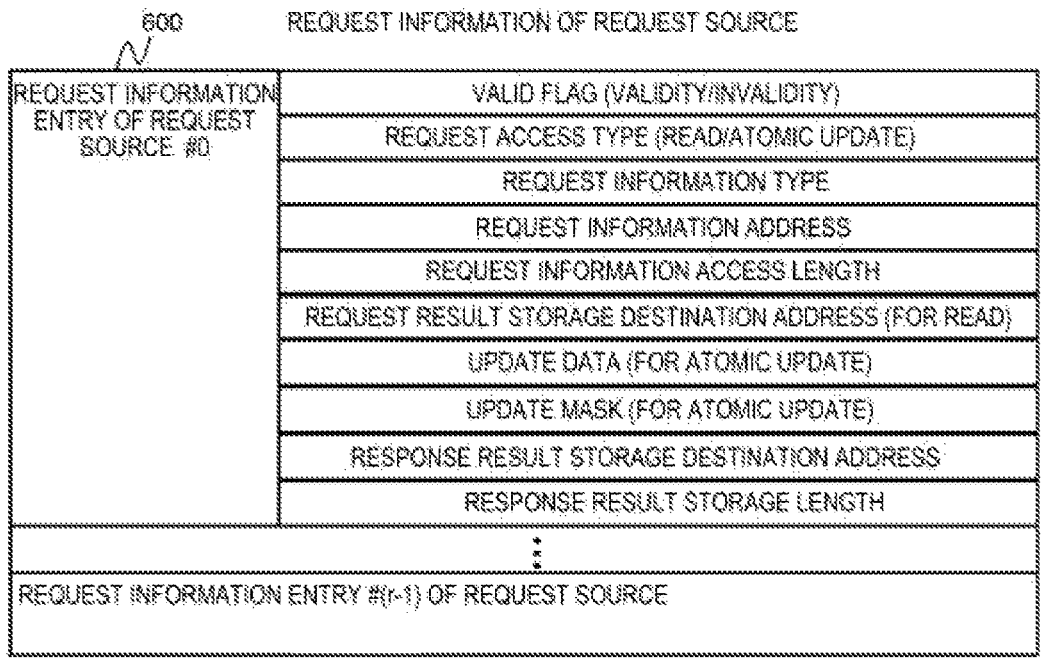

[FIG. 5]
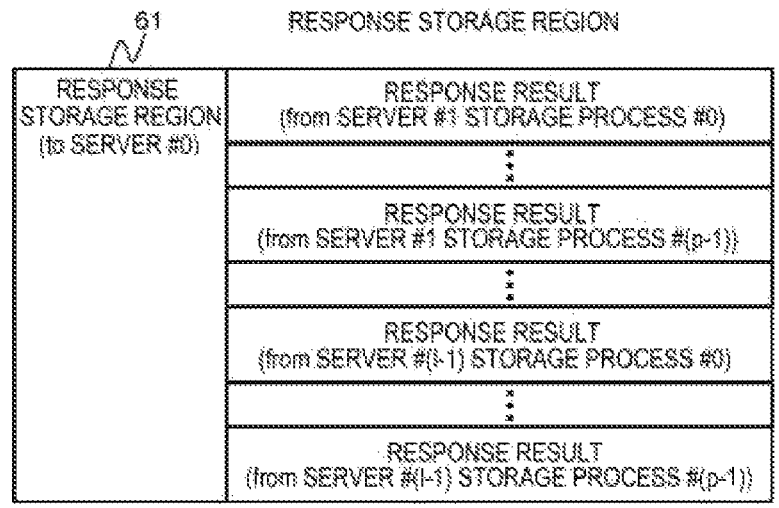
[FIG. 6]
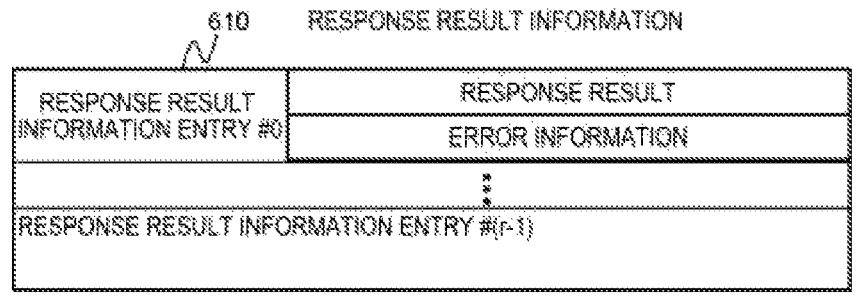

[FIG. 7]
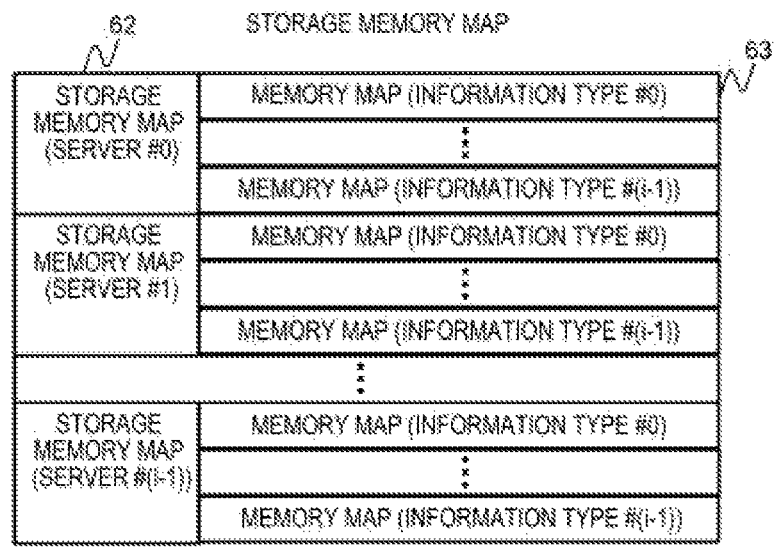
[FIG. 8]
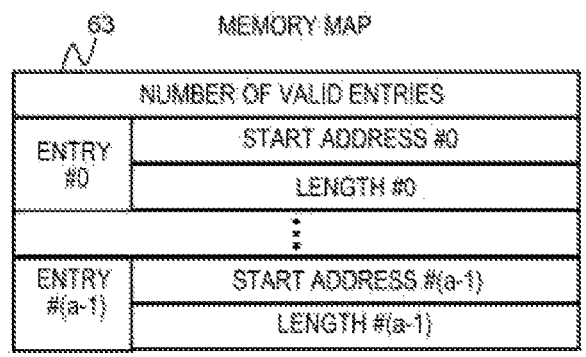

[FIG. 9]
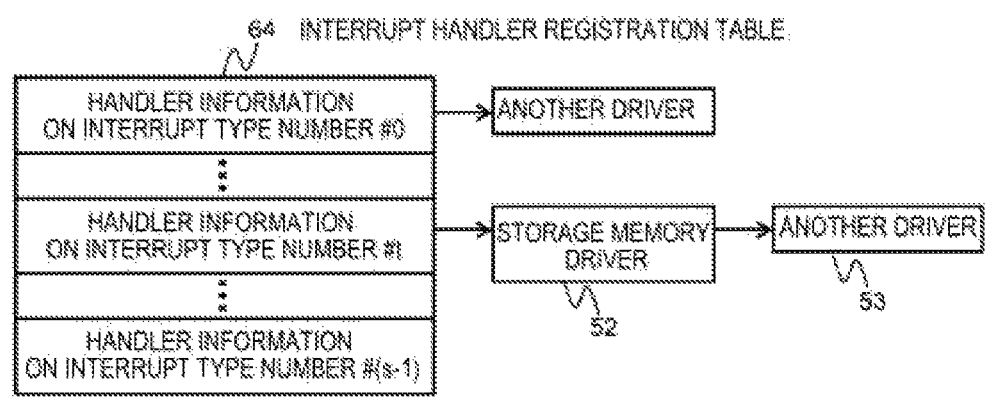

[FIG. 10]
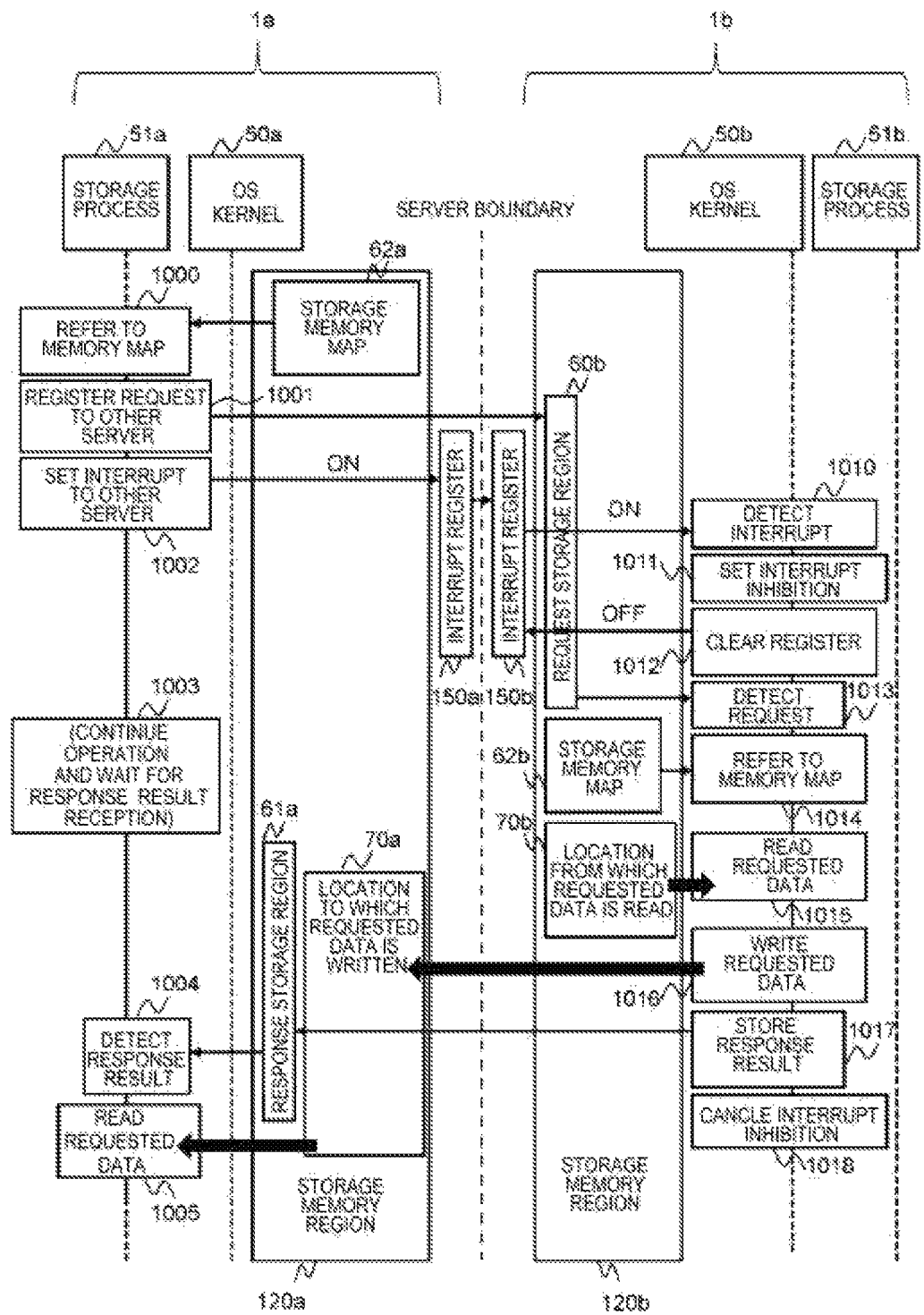

[FIG. 11]
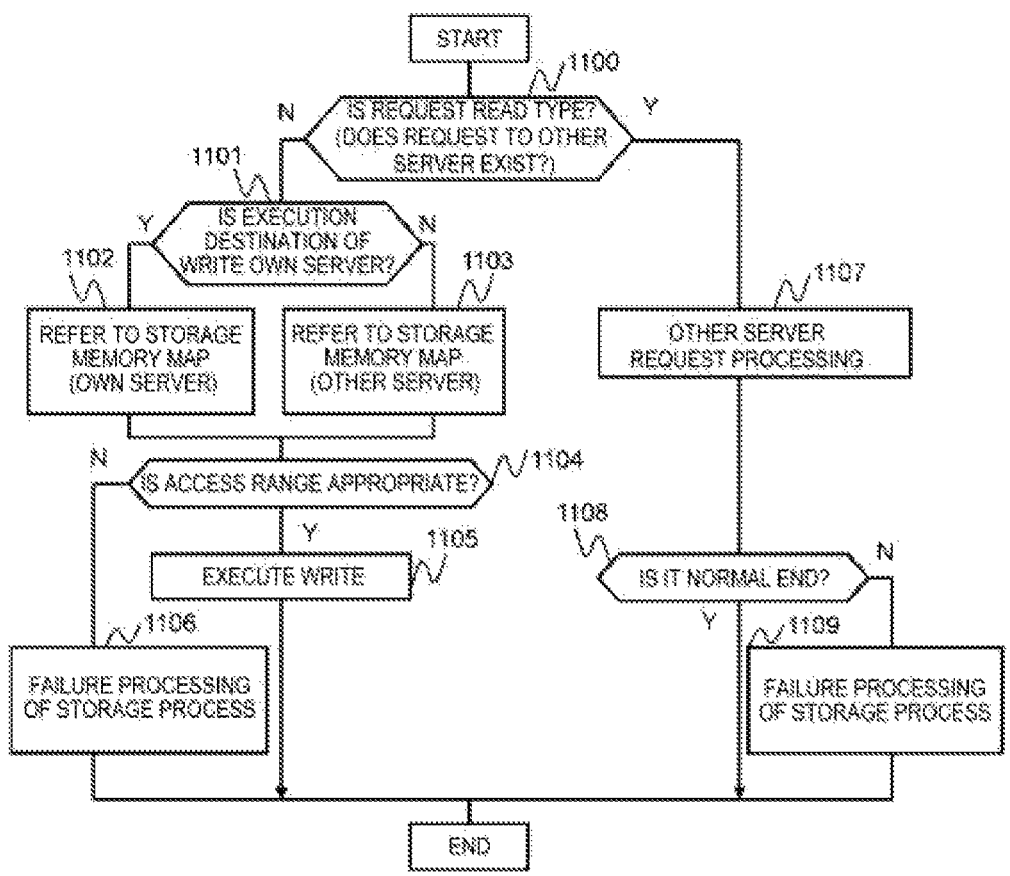

[FIG. 12]
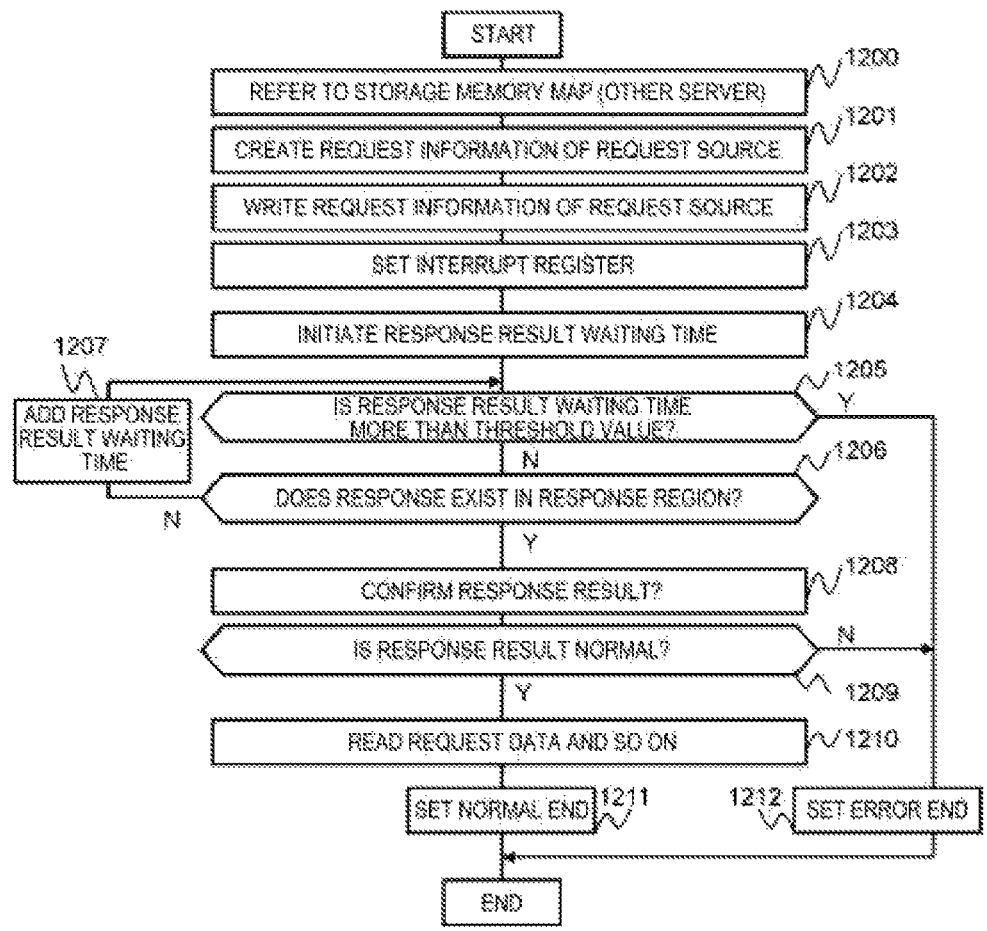

[FIG. 13]
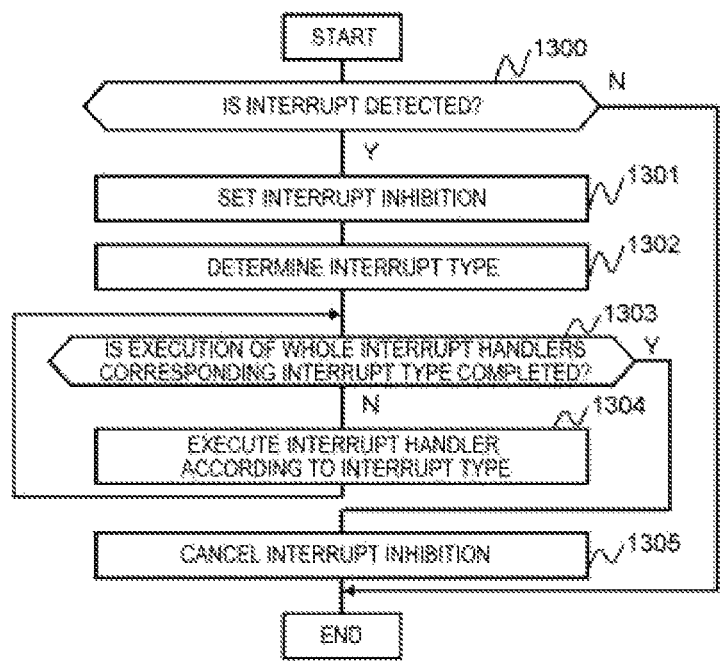

[FIG. 14]
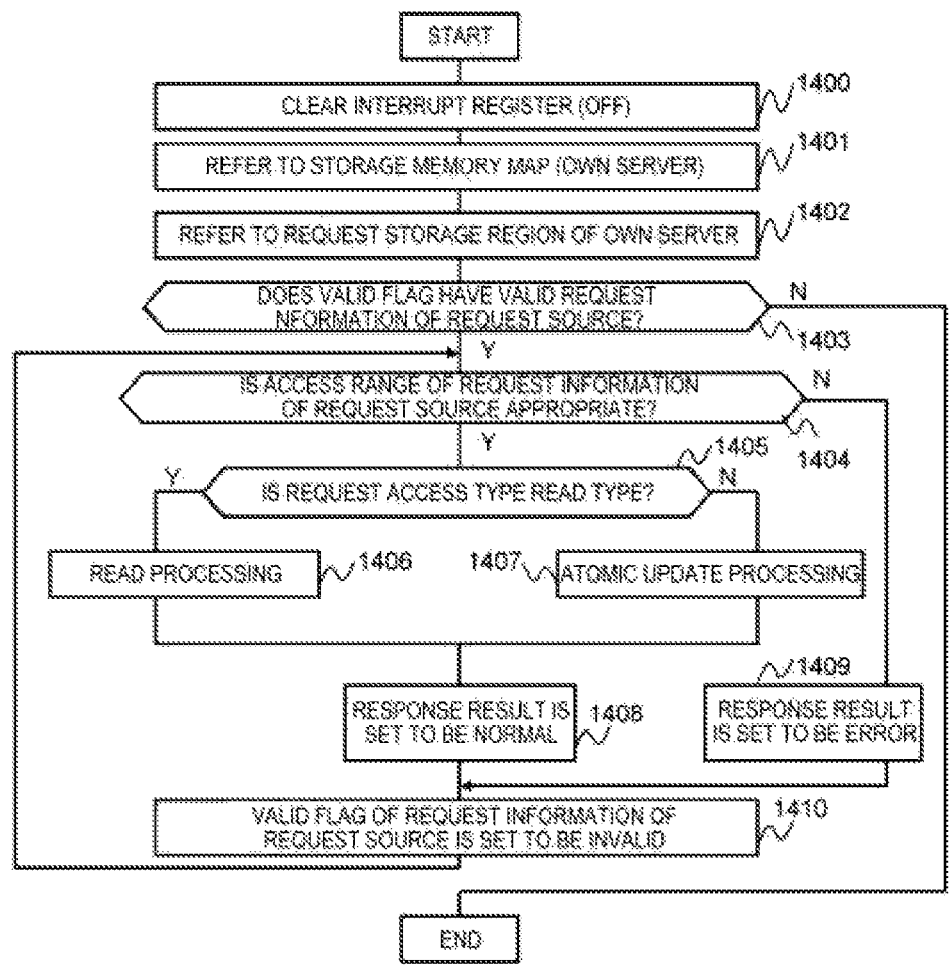

[FIG. 15]
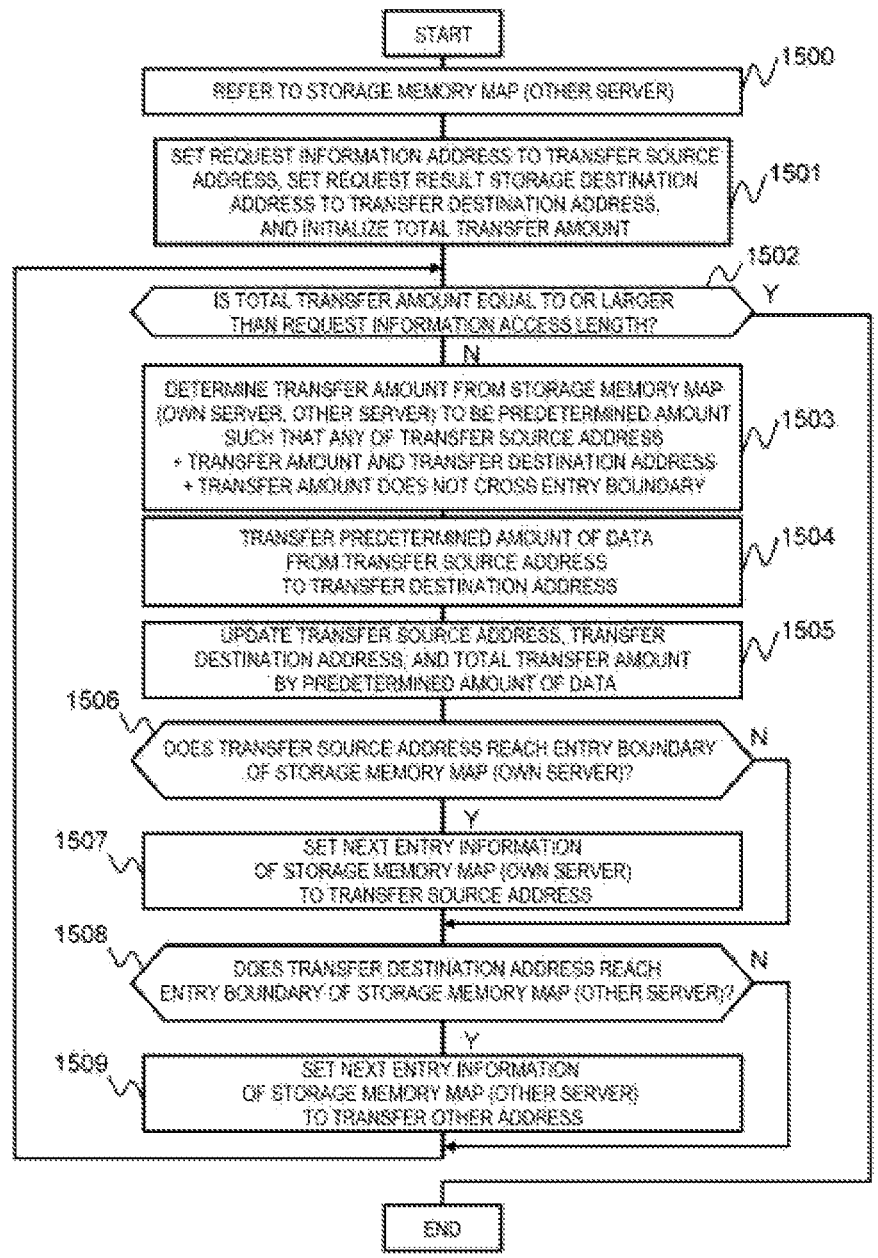

[FIG. 16]
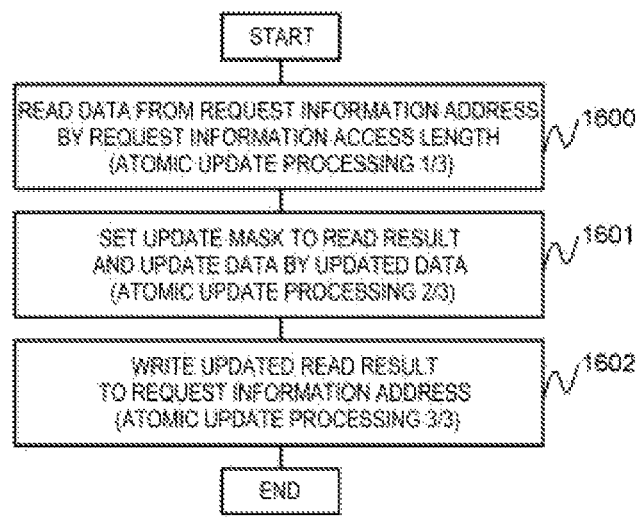

[FIG. 17]
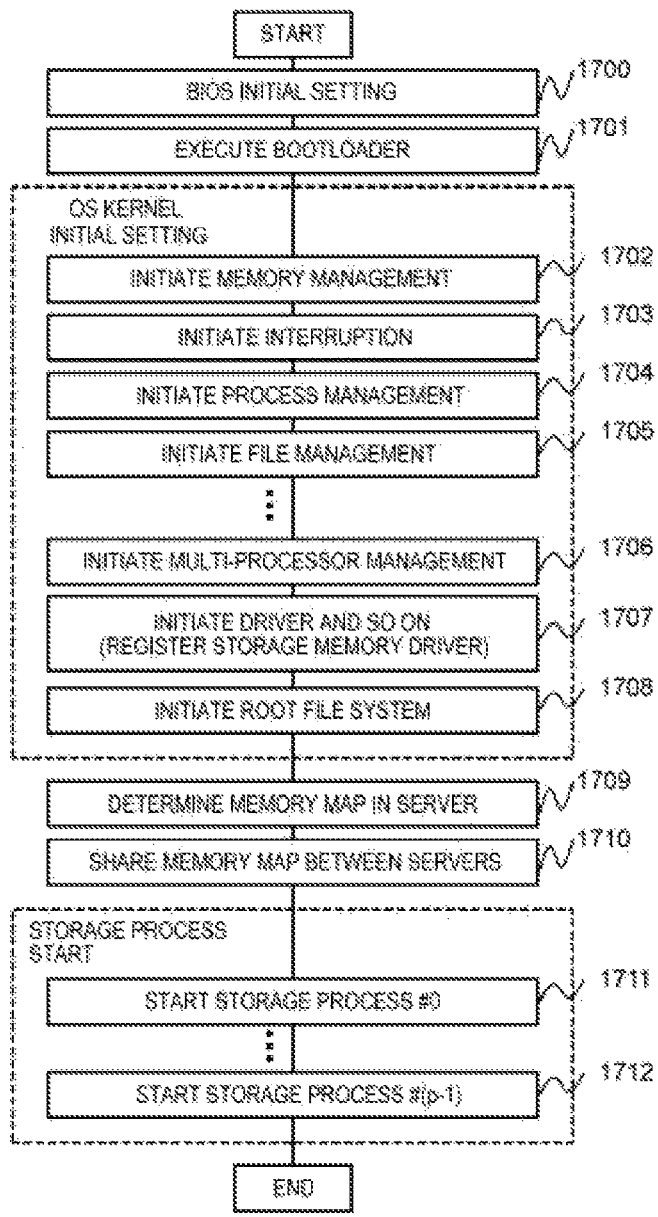

[FIG. 18]
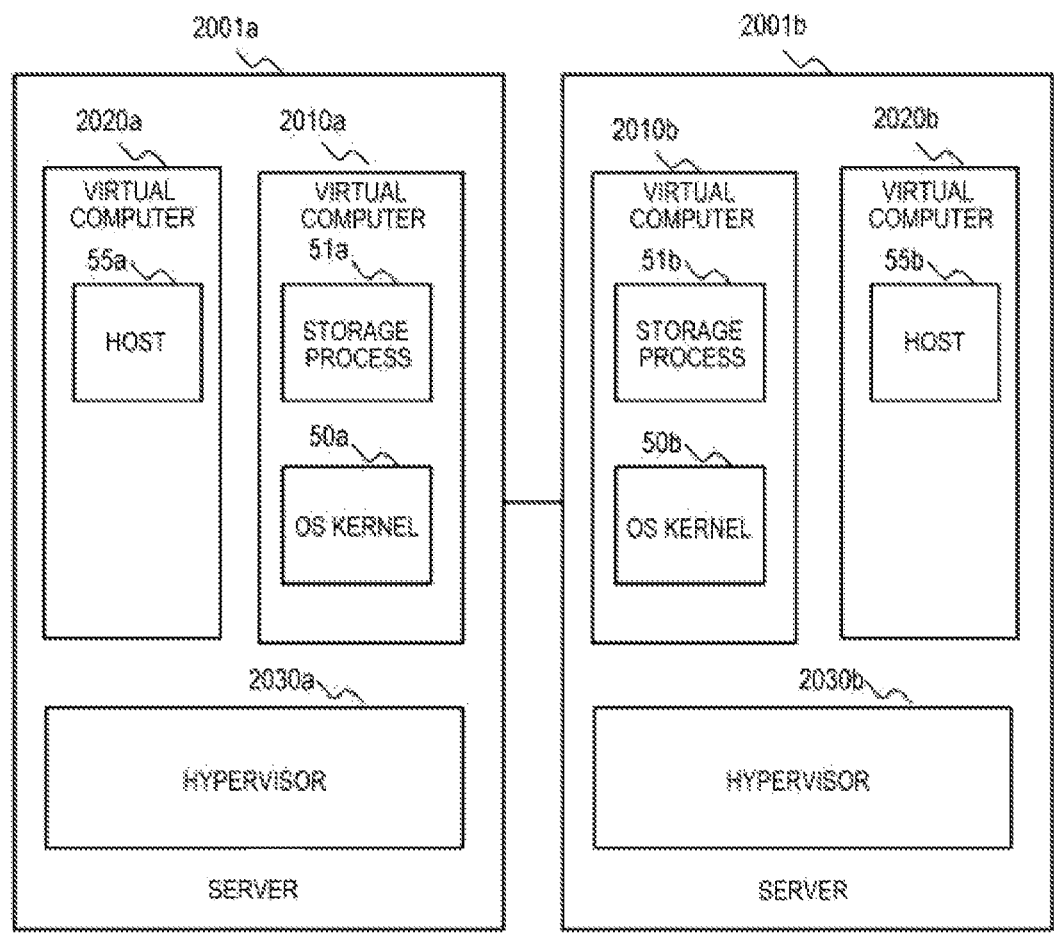

COMPUTER SYSTEM, PROCESSING METHOD, AND DRIVER PROGRAM

TECHNICAL FIELD

The present invention relates to a computer system having a storage function.

BACKGROUND ART

In order to reduce system costs, there is a technique for configuring a storage device using a plurality of storage controllers, each of which is constituted by general purpose hardware for inexpensive servers, without using dedicated LSI as the hardware of a storage device. Each of the plurality of controllers needs to read information on memories of other controllers. For example, reading of data on a memory of another controller from its own controller can be realized by writing data onto the memory of the own controller by another controller.

In this case, PTL 1 discloses a technique for suppressing deterioration in the response performance of I/O processing. In the technique of PTL 1, priority is set to a processing request exchanged between controllers, and a controller requested for processing executes from processing with higher priority. As a result, it is possible to suppress deterioration in the response performance of I/O processing with high priority.

CITATION LIST

Patent Literature

PTL 1: U.S. Pat. No. 9,003,081B2

SUMMARY OF INVENTION

Technical Problem

In general, it is considered that general purpose operating systems (OS) are improved day by day, and new functions with high convenience will be sequentially incorporated. Therefore, in a case of realizing a storage function as a processing process in a general purpose OS, it is desirable to improve the storage processing process so that the function with high convenience newly incorporated in the general purpose OS can be utilized. In addition, it is desirable to maintain low development cost continuously while utilizing the function with high convenience due to improvement of the processing process. In order to attain both advantages, it is important to follow the program structure of the general purpose OS and limit a correction range to a narrow range when improving the processing process.

A server that realizes a storage function in the processing process of a general purpose OS normally realizes processing requested from another server by a series of processing steps (1) to (3) shown below. (1) In a request destination server, the kernel of a general purpose OS receives a request from a request source server as an interrupt request. (2) The request destination server notifies the request from the request source server to a processing process for realizing storage function on the general purpose OS to start the processing process. (3) The processing process of the request destination server processes the request from the request source server.

However, in such an operation, in (2) above, overhead by the processing of starting the processing process in the request destination server is large and the performance of I/O processing is deteriorated. This is not solved by the technique disclosed in PTL 1.

An object of the present invention is to provide a technique for improving storage processing performance by using general purpose hardware.

Solution to Problem

In order to achieve the above object, a computer system according to an aspect of the present invention includes a plurality of servers connected to each other via a communication line, each server being constituted by hardware including a memory and a processor, an OS program and a storage program being stored in the memory and the OS program and the storage program being executed by the processor, wherein one of the plurality of servers acts as a request source server while one of the other servers acts as a request destination server. When the request source server reads data of the request destination server, the processor of the request source server executes the storage program to transmit a data read request to the request destination server, and the processor of the request destination server executes a storage memory driver incorporated in the OS program to read the requested data from an own memory and transmit the read data to the request source server. The request source server then executes the storage program to acquire the data.

Advantageous Effects of Invention

Since the processing in the request destination server is executed by the OS program, the request destination server does not need to start a processing process when a request is received from the request source server, and the processing can be promptly executed.

BRIEF DESCRIPTION OF DRAWINGS

FIG. 1 is a block view of a computer system according to an embodiment of the present invention.

FIG. 2 is a block view showing a hardware configuration of the computer system according to the embodiment.

FIG. 3 is a view showing an example of a request storage region 60.

FIG. 4 is a view showing an example of request information of a request source 600.

FIG. 5 is a view showing an example of a response storage region 61.

FIG. 6 is a view showing an example of response result information 610.

FIG. 7 is a view showing an example of a storage memory map 62.

FIG. 8 is a view showing an example of a memory map 63.

FIG. 9 is a view showing an example of an interrupt handler registration table 64.

FIG. 10 is a flow chart showing read processing with a request from an own server to the other server.

FIG. 11 is a flow chart showing data access processing that operates in a storage process 51a of a request source.

FIG. 12 is a flow chart showing the other server request processing that operates in the storage process 51a of the request source.

FIG. 13 is a flow chart showing interrupt start processing that operates in an OS kernel 50b of a request destination.

FIG. 14 is a flow chart showing storage memory driver processing that operates in the OS kernel 50b of the request destination.

FIG. 15 is a flow chart showing read processing in the storage memory driver processing that operates in the OS kernel 50b of the request destination.

FIG. 16 is a flow chart showing atomic update processing in the storage memory driver processing that operates in the OS kernel 50b of the request destination.

FIG. 17 is a flow chart showing initial setting processing of all of servers.

FIG. 18 is a view showing another configuration example of the computer system.

DESCRIPTION OF EMBODIMENTS

FIG. 1 is a block view of a computer system according to an embodiment of the present invention. The computer system has servers 1a and 1b. Each of the servers 1a and 1b is constituted by general purpose hardware including a memory and a processor. The server 1a has a communication unit 12a, and the server 1b has a communication unit 12b. The servers 1a and 1b are connected to each other via the communication unit 12a and the communication unit 12b of each server.

Since the two servers 1a and 1b have the same configuration, the server 1a will be described herein. The server 1a has a configuration in which a CPU 10a, a memory 11a, and the communication unit 12a are connected to each other. The communication unit 12a may be, for example, a non-transparent bridge (NTB) connected to PCI Express or the like. In addition, as seen from the server 1a, the server 1a is called an own server and the server 1b or the like other than the server 1a is called the other server. Hereinafter, the operation outline in a case where data on a memory of the server 1b is acquired from the server 1a will be described.

First, in a case where data to be read is detected to exist in a location from which requested data is read 70b of the server 1b in a storage process 51a of the server 1a, the server 1a acts as a request source server for requesting reading of data and the server 1b acts as a request destination server. The server 1a and the server 1b mutually share memory maps.

The server 1a (1) refers to a storage memory map 62a and (2) sets the address and length of data to be read in the server 1b, the storage address of the data to be read in the server 1a, the information of the response storage region 61b, or the like in a request storage region 60b of the other server. Next, when the server 1a (3) sets an interrupt in an interrupt register 150a, the interrupt is notified to an interrupt register 150b of the communication unit 12b connected to the communication unit 12a and thus the interrupt is generated in the server 1b.

In the server 1b, (4) a storage memory driver 52b of an OS kernel 50b corresponding to the interrupt of the communication unit 12b is activated and the storage memory driver 52b performs the following operations without notification to a storage process 51b. (5) The storage memory driver 52b refers to the request storage region 60b or (6) refers to a storage memory map 62, (7) reads the data to be read from the location from which requested data is read 70b to transfer the data to the server 1a (write the data onto a location to which requested data is written 70a). Further, the server 1b (8) writes the processing result onto a response storage region 61a.

In the server 1a, (9) the storage process 51a for detecting a response showing the processing result stored in the response storage region 61a reads the data to be read in the location to which requested data is written 70a to continue the processing. The server 1b detects the response of the processing result by, for example, polling.

In the above-described operation (4), in the server 1b, (5×) the storage memory driver 52b does not transmit the processing request from the storage process 51a to the storage process 51b, and the storage memory driver 52b itself processes the processing request from the storage process 51a, so that the OS kernel 50b reduces overhead by the processing of re-activating the storage process 51b and avoids deterioration in I/O processing performance. That is, when the request source server 1a reads data of the request destination server 1b, the processor of the request source server 1a executes a storage program and thus the storage process 51a transmits a request of reading data to the request destination server 1b. The processor of the request destination server 1b executes the storage memory driver 52b incorporated in an OS program (OS kernel) 50a and reads the requested data from the own memory to transmit the read data to the request source server 1a. The request source server 1a executes the storage program to acquire the data. Since the processing in the request destination server 1b is executed by the OS program, the request destination server 1b does not need to start a processing process when the request destination server receives a request from the request source server 1a and can promptly execute processing.

FIG. 2 is a block view showing a hardware configuration of the computer system according to the embodiment.

The server 1 has a configured to include a CPU (processor) 10, a memory 11, a communication unit 12, and an external I/F 13, which are connected to each other. A plurality of combinations of the CPU 10, the memory 11, the communication unit 12, and the external I/F 13 may exist or combinations may be connected to each other.

The CPU 10 has a plurality of cores 100. In the memory 11, an OS memory region 110 managed by an OS and a storage memory region 120 not managed by the OS exist. In the OS memory region 110, an OS program 50 that operates as an OS kernel, a storage program 51 that operates as a storage process on the OS kernel, and a storage memory driver 52 that operates as an interrupt driver on the OS kernel exist. The storage memory region 120 is divided into a region that stores various types of management information 130, and a region that stores user data 140. The communication unit 12 realizes information transmission or interrupt between the servers.

The server 1 is connected to a network 4 via the external I/F 13, and a client 2 that requests I/O processing such as read/write by files and blocks, and a storage device 3 in which the server 1 stores user data are connected to the server 1. In addition, a management terminal 5 that manages the setting and status of the server 1 and a maintenance terminal 6 that maintains a faulty part of the server 1 are connected to the network 4.

FIG. 3 is a view showing an example of a request storage region 60. The request storage region 60 is stored in the storage memory region 120 as management information 130. The request storage region 60 is a region provided for each server. In the server 1, a region for storing a plurality of pieces of request information of the request source 600 according to a plurality of storage processes of a plurality of servers acting as request sources of data read or the like is provided. In FIG. 3, the request storage region 60 for storing requests from a plurality of storage processes #0 to #(p-1) of a plurality of servers other than a server #1 in the server #1 is shown.

FIG. 4 is a view showing an example of request information of the request source 600. The request information of the request source 600 is stored in the storage memory region 120 as management information 130. The request information of the request source 600 has entries with a multiplicity r that receive concurrent requests from a certain storage process of a certain server. The content of the entry of the request information of the request source includes a valid flag indicating whether the entry is valid or invalid, an access type (read/atomic update) indicating the processing content in the request destination, a request information type indicating the type of information to be accessed in request destination, a request information address indicating a leading address of information to be accessed in request destination, a request information access length indicating the length of information to be accessed in the request destination, a request result storage destination address that is used in a case where the access type is a read type and is a leading address for storing information read in the request source, update data that is used when the access type is atomic update and has the content to perform atomic update in the request destination, an update mask specifying an atomic update range in the request destination, a response result storage destination address that is a leading address for storing the response result of the requested process, and a response result storage length indicating the length of a region for storing the response result. Herein, only read and atomic update are described as the request access type, but there may be other access forms.

FIG. 5 is a view showing an example of a response storage region 61. The response storage region 61 is stored in the storage memory region 120 as management information 130. The response storage region 61 is a region provided for each server. A region for storing a plurality of pieces of response result information 610 according to a plurality of storage processes of a plurality of servers acting as request destinations is provided. In FIG. 5, the response storage region 61 capable of storing responses from a plurality of storage processes #0 to #(p-1) of a plurality of servers other than a server #0 in the server #0 is shown.

FIG. 6 is a view showing an example of response result information 610. The response result information 610 is stored in the storage memory region 120 as management information 130. The response result information 610 has entries with a multiplicity r only that receive concurrent requests from a certain storage process of a certain server. The content of the entry of the response result information includes a response result indicating normal/error and error information for storing factors in a case where the response result is an error.

FIG. 7 is a view showing an example of a storage memory map 62. The storage memory map 62 is stored in the storage memory region 120 as management information 130. All the servers 1 hold storage memory maps 62 of all the servers including the memory maps of the own server and other servers. The storage memory map 62 of each server has a memory map 63 for each information type.

FIG. 8 is a view showing an example of a memory map 63. The memory map 63 is stored in the storage memory region 120 as management information 130. The memory map 63 has a plurality of entries in order to handle a state in which information to be stored is distributed and stored in discrete memory regions. The memory map 63 includes the number of valid entries for storing the number of valid entries, and a leading address for each entry in which information of the information type is stored and a length which is the length thereof.

FIG. 9 is a view showing an example of an interrupt handler registration table 64. The interrupt handler registration table 64 is stored in the OS memory region 110. The interrupt handler registration table 64 has the management structure of the OS program 50 and an interrupt handler is registered at a position corresponding to the interrupt type number of the generated interrupt. The storage memory driver 52 is registered as an interrupt handler at a position (interrupt type number #t in FIG. 9) corresponding to the interrupt type number of the communication unit 12 at the time of system activation or at the time of maintenance recovery after occurrence of failure or the like. In addition, another driver 53 may be registered as an interrupt handler for the same interrupt type number.

FIG. 10 is a flow chart showing read processing with a request from an own server to the other server. Herein, the request source is the storage process 51a of the request source server 1a, and the request destination is the OS kernel 50b of the request destination server 1b. Although the operation subject is described as the storage process 51a herein, the operation subject may be the CPU 10a or the request source server 1a.

The storage process 51a as the request source refers to the storage memory map 62a (Step 1000), registers a request to the other server to the request storage region 60b (Step 1001), and sets an interrupt to the other server in the interrupt register 150a (Step 1002).

Then, the storage process 51a continues the operation, waits for receiving the response result (Step 1003), detecting the response result in the response storage region 61a (Step 1004), and then reads the requested data from the location to which requested data is written 70a (Step 1005).

The OS kernel 50b as the request destination detects an interrupt (Step 1010) and then inhibits further an interrupt during interrupt processing (Step 1011). Next, the OS kernel 50b clears the interrupt register 150b (Step 1012) and detects the request stored in the request storage region 60b (Step 1013). The OS kernel 50b then refers to the storage memory map 62b (Step 1014), reads the request data from the location from which requested data is read 70b (Step 1015), and writes the requested data onto the location to which requested data is written 70a (Step 1016). Further, the response result is written in the response storage region 61a (Step 1017) and cancels the interrupt inhibition (Step 1018).

In this case, the request source server 1a refers to the memory map of the request destination server 1b, specifies the address (first address) of the data to be read on the memory of the request destination server 1b, and transmits the data read request specifying the first address to the request destination server 1b. When the request destination server 1b receives the request, the request destination server reads data from the first address and transmits the read data to the request source server 1a. Since the request source server 1a knows the memory map of the request destination server 1b, the request source server 1a can request reading of data by specifying the address of the request destination server 1b and can easily acquire the desired data.

In addition, the request destination server 1b refers to the memory map of the request source server 1a, specifies an address (second address) on the memory of the request source server 1a in which the requested data from the request source server 1a is written, and writes the read data to the second address of the request source server 1a, and the request source server 1a reads the data from the second address on its own memory. Since the request destination server 1b knows the memory map of the request source server 1a in advance, the request destination server 1b can write the data by specifying the address of the request source server 1*a* and can easily transmit the desired data.

The request source server 1*a* has a response storage region for each request destination server 1*b*. When the request destination server 1*b* writes the data to the second address of the request source server 1*a*, the request destination server stores the response to the request in the response storage region corresponding to the request source server 1*a* itself. When the request source server 1*a* detects the response stored in the response storage region thereof, the request source server reads data from the second address. Since the request source server 1*a* has a response storage region for each request destination server 1*b*, the request source server 1*a* make requests to the plurality of request destination servers 1*b* in parallel.

Hereinafter, the details of the operation shown in FIG. 11 will be described.

FIG. 11 is a flow chart showing data access processing that operates in a storage process 51*a* of a request source. Although the operation subject is described as the storage process 51*a* herein, the operation subject may be the CPU 10*a* or the request source server 1*a*.

The data access processing is executed in a case where it is necessary for the storage process 51*a* to access data such as management information stored in the memory 11*a* in the various processing.

The storage process 51*a* first determines whether or not the generated data access request is a read type request requiring the request to the other server (Step 1100). In a case where the data access request is a read type request requiring the request to the other server (Y in Step 1100), the storage process 51*a* proceeds to Step 1107. In a case where the data access request is not a read type request requiring the request to the other server (N in Step 1100), the storage process 51*a* determines that the request is a write request and determines whether or not the execution destination of write is the own server (Step 1101).

In a case where the execution destination of write is the own server (Y in Step 1101), the storage process 51*a* refers to the range of the own server of the storage memory map 62*a* (Step 1102). In a case where the execution destination of write is not the own server (N in Step 1101), the storage process 51*a* refers to the range of the other server corresponding to the write execution destination of the storage memory map 62*a* (Step 1103).

Next, the storage process 51*a* determines whether or not the access range of the write execution destination is appropriate (Step 1104) in the storage memory map 62*a* referred to in Step 1102 or Step 1103 (Step 1104). Specifically, the storage process 51*a* determines whether or not the region indicated by the leading address of the write execution destination and the length of the region is included in the range indicated by the start address and the length of the entry in the memory map 63.

In a case where the access range of the write execution destination is appropriate (Y in Step 1104), the storage process 51*a* executes write (Step 1105) and ends the processing.

On the other hand, in a case where the access range of the write execution destination is not appropriate (N in Step 1104), the storage process 51*a* determines that the write is failed and executes the failure processing of the storage process (Step 1106). In the failure processing of the storage process, for example, the detailed information related to the access failure is recorded as a log, the number of occurrences of the access failure is counted, the processing ends without executing the I/O request under execution by an error, and the storage process 51*a* itself is reset.

On the other hand, in a case where the data access request is a read type request requiring the request to the other server (Y in Step 1100), the storage process 51*a* executes the other server request processing requiring read of data to the other server in Step 1107 (Step 1107). The details of the other server request processing will be described later with reference to FIG. 12.

Next, the storage process 51*a* determines whether or not the other server request processing ends normally (Step 1108). In a case where the other server request processing ends normally (Y in Step 1108), the storage process 51*a* ends the processing. On the other hand, in a case where the other server request processing does not end normally (N in Step 1108), the storage process 51*a* executes the same failure processing of the storage process as in Step 1106 (Step 1109).

FIG. 12 is a flowchart showing the other server request processing that operates in the storage process 51*a* of the request source. Although the operation subject is described as the storage process 51*a* herein, the operation subject may be the CPU 10*a* or the request source server 1*a*.

First, the storage process 51*a* refers to the range of the other server corresponding to the execution destination of the request in the storage memory map 62*a* (Step 1200).

Next, the storage process 51*a* creates request information of the request source 600 transmitted to the request destination server 1*b* (Step 1201). At this time, the storage process 51*a* sets a request access type, a request information address, a request information access length, a response result storage address, and a response result storage length in an empty region of the storage memory region 120*a* of the own server as request information of the request source 600. Further, in a case where the request is a read request, the storage process 51*a* sets a request result storage destination address, and in a case where the request is an atomic update request, the storage process sets update data and an update mask.

Next, the storage process 51*a* writes the request information of the request source 600 created in the empty region of the storage memory region 120*a* of the own server onto the request storage region 60*b* of the storage memory region 120*b* of the other server. Subsequently, the storage process 51*a* sets the valid flag to be valid (Step 1202). In addition, in a case where the multiplicity of the request requested to the request destination server 1*b* is equal to or higher than r, the storage process 51*a* may make the valid flag valid after waiting for end of the request being executed.

Next, the storage process 51*a* sets an interrupt in the interrupt register 150*a* (Step 1203). When the interrupt is set in the interrupt register 150*a*, the interrupt setting is notified to the interrupt register 150*b* of the request destination and an interrupt occurs in the request destination server 1*b*.

Next, the storage process 51*a* initializes the response result waiting time to be measured while waiting for the response result from the request destination server 1*b* to zero (Step 1204). Next, the storage process 51*a* determines whether or not the response result waiting time from the request destination server 1*b* is more than the threshold value (Step 1205). In a case where the response result waiting time is more than the threshold value (Y in Step 1205), the storage process 51*a* sets error end (Step 1212) and ends the processing. On the other hand, in a case where the response result waiting time from the request destination server 1*b* is not more than threshold value (N in Step 1205), the storage process 51a polls the response storage region 61a and determines whether or not the response result is stored (Step 1206).

In a case where the response result is not stored in the response storage region 61a (N in Step 1206), the storage process 51a adds the response result waiting time (Step 1207) and the process returns to Step 1205. In a case where the response result is stored in the response storage region 61a (Y in Step 1206), the storage process 51a confirms the response result (Step 1208) and subsequently, the storage process 51a determines whether or not the response result is normal (Step 1209).

As long as the response result is normal (Y in Step 1209), in a case where the request is a read request, the storage process 51a reads the requested data and in a case where the request is an atomic update request, if necessary, the storage process 51a executes reading of the execution result or the like (Step 1210). Next, normal end is set (step 1211) and the processing ends.

On the other hand, in a case where the response result is not normal (N in Step 1209), the storage process 51a sets information called error end (Step 1212) and ends the processing.

FIG. 13 is a flow chart showing interrupt start processing that operates in an OS kernel 50b of a request destination. The interrupt start processing is processing in which the OS kernel is mounted as a normal function. Although the operation subject is described as the OS kernel 50b herein, the operation subject may be a CPU 10b or the request destination server 1b.

First, the OS kernel 50b determines whether or not an interrupt is detected (Step 1300). Ina case where an interrupt is not detected (N in Step 1300), the OS kernel 50b ends the processing. In a case where an interrupt is detected (Y in Step 1300), the OS kernel 50b set interrupt inhibition for inhibiting further interrupts from occurring to avoid competition of interrupt processing (Step 1301).

Next, the OS kernel 50b determines the type of interrupt (Step 1302). Next, based on the determined interrupt type, the OS kernel 50b refers to the interrupt handler registration table 64 shown in FIG. 9 as an example and specifies an interrupt handler to be executed. There may be a plurality of interrupt handlers to be executed.

Next, the OS kernel 50b determines whether or not the whole interrupt handler corresponding to the interrupt type is executed (Step 1303). In a case where the whole interrupt handler corresponding to the interrupt type is not executed (N in Step 1303), the OS kernel 50b selects the remaining interrupt handler corresponding to the interrupt type and executes the interrupt handler (Step 1304). In a case where the whole interrupt handler corresponding to the interrupt type is executed (Y in Step 1303), the OS kernel 50b cancels the setting of interrupt inhibition (Step 1305) and ends the processing.

FIG. 14 is a flow chart showing storage memory driver processing that operates in the OS kernel 50b of the request destination. The storage memory driver processing is processing that operates in the OS kernel 50b and is started by an interrupt, and is executed in Step 1304 as one interrupt handler. Although the operation subject is described as the OS kernel 50b herein, the operation subject may be a CPU 10b or the request destination server 1b.

When the storage memory driver processing is started by the interrupt, first, the OS kernel 50b clears the interrupt register 150b and is set to be a state in which the next interrupt notification can be received. However, since the interrupt inhibition is set in Step 1301, even when the OS kernel 50b receives the next interrupt notification, the interrupt does not occur until the setting of interrupt inhibition is canceled in Step 1305.

Next, the OS kernel 50b refers to the range of the own server of the storage memory map 62b (Step 1401). Next, the OS kernel 50b refers to the range of the request storage region 60b of the own server (Step 1402). Subsequently, the OS kernel 50b determines whether or not the request information of the request source 600 in which the valid flag is set to be valid exists in the request storage region 60b (Step 1403).

In a case where the request information of the request source 600 in which the valid flag is set to be valid does not exist (N in Step 1403), the OS kernel 50b ends the processing. On the other hand, in a case where the request information of the request source 600 in which the valid flag is set to be valid exists (Y in Step 1403), the OS kernel 50b then determines whether or not the access range of the request information of the request source 600 is appropriate (Step 1404). Specifically, it is possible to determine whether or not the range indicated by the request information address and the request information access length is included in the range indicated by the start address of the entry and the length of the entry in the memory map 63 of the storage memory map 62b corresponding to the request information type.

In a case where the access range of the request information of the request source 600 is not appropriate (N in Step 1404), the OS kernel 50b sets an error in the response result of the response storage region 61a (Step 1409) and sets the valid flag of the request information of the request source to be invalid (Step 1410), and the process returns to Step 1404. On the other hand, in a case where the access range of the request information of the request source 600 is appropriate (Y in Step 1404), the OS kernel 50b determines whether or not the request access type of the request information of the request source 600 is a read type (Step 1405).

In a case where the request access type is a read type (Y in Step 1405), the OS kernel 50b executes read processing (Step 1406). The read processing of Step 1406 is processing of reading data, and the details thereof will be described later. On the other hand, in a case where the request access type is not a read type (N in Step 1405), the OS kernel 50b executes atomic update processing (Step 1407). The atomic update processing of Step 1407 is processing of updating data without going through an intermediate state and the details thereof will be described later.

Next, the OS kernel 50b sets a response result in the response storage region 61a to be normal (Step 1408), and sets the valid flag of the request information of the request source 600 to be invalid (Step 1410), and the process returns to Step 1404.

In addition, the same numbers as the request information of the request source entry numbers 0 to (r-1) corresponding to the multiplicity r of the request information of the request source 600 may be assigned to the storage destinations of the response results of the response storage region 61a.

As shown herein, an OS kernel 50b executed by the CPU 10b of the request destination server 1b determines whether or not the address (first address) of the access destination in the request destination server 1b specified from the request source server 1a is in an appropriate region, and in a case where the address is not appropriate, an error response is transmitted to the request source server 1a. Therefore, since error processing is performed in a case where the address specified by the request source server 1a is not in an appropriate region in the request destination server 1b, before the sharing of the memory maps of the request source server 1a and the request destination server 1b is collapsed and an access to an inappropriate region occurs, the access can be regarded as an error.

FIG. 15 is a flow chart showing read processing in the storage memory driver processing that operates in the OS kernel 50b of the request destination. In the read processing, data transfer is executed while determining the following (a) and (b). (a) Referring to the ranges of both the own server and the other server of the storage memory maps 62b, the amount of data that can be transferred at once is determined from the start address and the length of the memory map 63 such that the amount is in a continuous address range in both a transfer source (request destination) and a transfer destination (request source). (b) In a case where a transfer source or a transfer destination reaches the address boundary, the address of the boundary of the transfer source or the transfer destination is set as a start address of the next entry of the memory map 63 and the memory map 63 is updated.

First, the OS kernel 50b refers to the range of the other server corresponding to the request source of the read request of the storage memory map 62b (Step 1500). Next, the OS kernel 50b refers to the request information of the request source 600 shown in FIG. 4 as an example, sets the request information address to the transfer source address, sets the request result storage destination address to the transfer destination address, and initializes the total transfer amount (Step 1501).

Next, the OS kernel 50b determines whether or not the total transfer amount is equal to or larger than the request information access length (Step 1502). In a case where the total transfer amount is equal to or larger than the request information access length (Y in Step 1502), the OS kernel 50b ends the processing. On the other hand, in a case where the total transfer amount is less than the request information access length (N in Step 1502), the OS kernel 50b determines the next transfer amount (Step 1503). At this time, the OS kernel 50b determines a predetermined amount as a transfer amount from the memory map 63 of the storage memory map 62b such that an address obtained by adding the transfer amount to the transfer source address does not cross the entry boundary and an address obtained by adding the transfer amount to the transfer destination address also does not cross the entry boundary.

Next, the OS kernel 50b transfers a predetermined amount of data determined as the transfer amount from the transfer source address to the transfer destination address (Step 1504). Next, the OS kernel 50b updates such that the transfer source address, the transfer destination address, and the total transfer amount are increased by the predetermined amount of data (Step 1505).

Next, the OS kernel 50b determines whether or not the transfer source address reaches the entry boundary of the memory map 63 in the storage memory map 62b corresponding to the own server (Step 1506). In a case where the transfer source address does not reach the entry boundary of the memory map 63 (N in Step 1506), the OS kernel 50b proceeds to Step 1508. On the other hand, in a case where the transfer source address reaches the entry boundary of the memory map 63 (Y in Step 1506), the OS kernel 50b sets the next entry information of the memory map 63 of the storage memory map 62b corresponding to the own server to the transfer source address (Step 1507).

Next, the OS kernel 50b determines whether or not the transfer destination address reaches the entry boundary of the memory map 63 in the storage memory map 62b corresponding to the other server (Step 1508). In a case where the transfer destination address does not reach the entry boundary of the memory map 63 (N in Step 1508), the OS kernel 50b proceeds to Step 1502. On the other hand, in a case where the transfer destination address reaches the entry boundary of the memory map 63 (Y in Step 1508), the OS kernel 50b sets the next entry information of the memory map 63 of the storage memory map 62b corresponding to the other server in the transfer destination address (Step 1509).

As described herein, the OS kernel 50b executed by the CPU 10b of the request destination server 1b refers to the memory map of the request destination server 1b itself and the memory map of the request source server 1a, determine the transfer amount in which data can be read from a continuous region of the memory of the request destination server 1b and can be written in a continuous region of the memory of the request source server 1a, and transmits the transfer amount of data to the request source server 1a. These operations are repeatedly performed until the transmission of the requested data is completed. Thus, since such an amount of data that can be processed in the continuous region in the memories of both the request destination server 1b which is a data transfer source and the request source server 1a which is a data transfer destination is transmitted at once, the data can be effectively transferred and the processing can promptly end.

FIG. 16 is a flow chart showing atomic update processing in the storage memory driver processing that operates in the OS kernel 50b of the request destination. When the atomic update processing is started by the OS kernel 50b in the request destination server 1b, the hardware executes a series of single processing operations. The processing described in a plurality of steps of Step 1600 to Step 1602 in FIG. 16 is processing executed by the hardware.

First, the hardware reads data from the request information address by the request information access length (Step 1600), then sets an update mask to the data of the read result and updates the read result by the update data (Step 1601), and finally writes the data of the updated read result in the request information address (Step 1602). The data read in Step 1600 may be stored as an execution result in the response result storage destination address of the response storage region 61b.

As described with reference to FIGS. 14 and 16, when the request source server 1a atomically updates the data of the request destination server 1b, the CPU 10a of the request source server 1a executes the storage program to transmit a request of atomically updating data to the request destination server 1b. In the CPU 10b of the request destination server 1b, the storage memory driver incorporated in the OS program which has received the request starts processing of atomically updating the requested data. The atomic update processing is executed by the hardware. When the atomic update processing is completed, the CPU 10b notifies an update completion response to the request source server 1a. The CPU 10a of the request source server 1a executes the storage program to confirm the data update completion. Since the atomic update processing in the request destination server 1b is executed by the OS program, the request destination server 1b does not need to start the processing process when the request destination server receives the request from the request source server 1a and can execute the atomic update processing promptly.

FIG. 17 is a flow chart showing initial setting processing of all of servers. The initial setting processing is executed at the time of system activation and at the time of maintenance recovery after occurrence of failure.

First, the CPU 10 of the server 1 executes a bootloader (Step 1701) after BIOS initial setting (Step 1700). Thus, the initial setting of the OS kernel is started.

In the initial setting of the OS kernel, the bootloader initializes memory management information as a general initial setting item (Step 1702), initializes the interrupt state (Step 1703), initializes process management information (Step 1704), initializes file management information (Step 1705), initializes multi-processor management information (Step 1706), initializes the driver or the like (Step 1707), and initializes the root file system (Step 1708). The processing of registering the storage memory driver 52 in the interrupt handler registration table 64 shown in FIG. 9 as an example may be executed during the initialization of the driver or the like in Step 1707.

Next, the bootloader determines the memory map in the server (Step 1709) and mutually shapes the memory map between the servers (Step 1710). Thus, the storage memory maps 62 of the own server and the other server can be referred to.

Finally, the bootloader sequentially starts a storage process (Steps 1711 and 1712).

FIG. 18 is a view showing another configuration example of the computer system. Also in the configuration example, the request source server 1a and the request destination server 1b have the same configuration.

The configuration common to the request source server 1a will be described as an example. In the request source server 1a, a hypervisor 2030 is operated, one or a plurality of virtual computers 2010 and 2020 are built and operated on the hypervisor 2030. Herein, the virtual computer 2010 has a storage function and the virtual computer 2020 functions as a host. On the virtual computer 2010a, the above-described OS kernel 50a and the storage process 51a are operated.

The OS kernel 50a and the storage process 51a operated on the virtual computer 2010a in the request source server 2001a respectively correspond to the OS kernel 50a and the storage process 51a of the request source server 1a shown in FIG. 1. The OS kernel 50b and the storage process 51b operated on the virtual computer 2010b in the request destination server 2001b respectively correspond to the OS kernel 50b and the storage process 51b of the request destination server 1b shown in FIG. 1. The operations of the OS kernel 50a, the storage process 51a, the OS kernel 50b, and the storage process 51b are the same as in the description using FIGS. 1 to 17.

As described above, each program of the OS program 50, the storage program 51, and the storage memory driver 52 may be operated on the hardware of the physical computer as shown in FIG. 2 or may be operated on the virtual computer 2010 as shown in FIG. 18.

In addition, a host 55 may be a physical host computer, or may be a host program that operates on the virtual computer 2020 as shown in FIG. 18.

The virtual computer 2010 functioning as storage and the virtual computer 2020 functioning as a host may be on the same server 2001 or may be on different servers connected via a network as shown in FIG. 18.

Although the embodiment of the present invention has been described above, the present invention is not limited only to these embodiments. These embodiments may be used in combination or a part of the configuration may be changed within the range of the technical idea of the present invention.

REFERENCE SIGNS LIST

1: server, 1a: request source server, 1b: request destination server, 10: CPU, 100: core, 10a: CPU, 10b: CPU, 11: memory, 110: OS memory region, 11a: memory, 11b: memory, 12: communication unit, 120: storage memory region, 120a: storage memory region, 120b: storage memory region, 12a: communication unit, 12b: communication unit, 130: management information, 150a: interrupt register, 150b: interrupt register, 2: client, 2001a: request source server, 2001b: request destination server, 2010: virtual computer, 2010a: virtual computer, 2010b: virtual computer, 2020: virtual computer, 2030: hypervisor, 3: storage device, 4: network, 5: management terminal, 50: OS program (OS kernel), 50a: OS program (OS kernel), 50b: OS program (OS kernel), 51: storage program (storage process), 51a: storage program (storage process), 51b: storage program (storage process), 52: storage memory driver, 52a: storage memory driver, 52b: storage memory driver, 53: driver, 55: host, 6: maintenance terminal, 60: request storage region, 60a: request storage region, 60b: request storage region, 600: request information of request source, 61: response storage region, 61a: response storage region, 61b: response storage region, 610: response result information, 62: storage memory map, 62a: storage memory map, 62b: storage memory map, 63: memory map, 64: interrupt handler registration table, 70a: location to which requested data is written, 70b: location from which requested data is read

The invention claimed is:

1. A computer system comprising:
a plurality of servers connected to each other via a communication line, each of the plurality of servers has hardware including a memory and a processor, an OS program and a storage program being stored in the memory and the OS program and the storage program being executed by the processor which cause the processor to be capable of reading the memory of an own server and capable of writing to memories of the own server and the other servers of the plurality of servers,
wherein the processor of each of the plurality of servers is further caused to:
when receiving an access request, decide whether the own server is capable of processing the access request based on whether the access request is a read request or a write request and a storage location of the access request,
when the own server is capable of processing the access request, the storage program executed at the processor of the own server performs the access request, when the access request is the read request from a host, the storage program executed at the processor of the own server reads the data of the data read request from the host from the memory of the own server, and when the access request is the read request transmitted by the storage program of an other server, a storage memory driver incorporated in the OS program executed at the processor of the own server reads the data of the data read request from the memory of the own server,
when the access request is the read request and the storage location of the read request is the memory of another server of the plurality of servers:
the own server which received the read request acts as a request source server while the other server which is a target of the read request acts as a request destination server,
the storage program executed at the processor of the request source server transmits a data read request to the request destination server,
a storage memory driver incorporated in the OS program executed at the processor of the request destination server reads the data of the data read request transmitted by the storage program of the request source server from the memory of the request destination server and writes the data to the memory of the request source server, and the storage program executed at the processor of the request source server reads the data that has been read from the memory of the request destination server and written to the memory of the request source server from the memory of the request destination server.

2. The computer system according to claim 1, wherein the plurality of servers including the request source server and the request destination server mutually share memory maps in advance, the processor of the request source server is caused to:
refer to the memory map of the request destination server,
specify a first address of the memory of the request destination server, and
transmit the data read request including the first address to the request destination server, and the processor of the request destination server is caused to:
receive the data read request,
read the data of the data read request from the first address, and
write the data of the data read request from the first address to the memory of the request source server.

3. The computer system according to claim 1, wherein the plurality of servers including the request source server and the request destination server mutually share memory maps in advance, the processor of the request destination server is caused to:
refer to the memory map of the request source server,
specify a second address of the memory of the request source server, and
write the data of the data read request to the second address of the request source server, and the request source server is caused to:
read the data from the second address of the memory of the request source server.

4. The computer system according to claim 3, wherein the request source server includes a response storage region for each of the other servers, the request destination server is caused to:
when the data of the data read request is written in the second address of the request source server, store a response to the data read request in the response storage region corresponding to the request destination server, and the request source server is caused to:
when the response stored in the response storage region is detected, read the data from the second address of the memory of the request source server.

5. A computer system comprising:
a plurality of servers connected to each other via a communication line, each of the plurality of servers has hardware including a memory and a processor, an OS program and a storage program being stored in the memory and the OS program and the storage program being executed by the processor which cause the processor to be capable of reading the memory of an own server and capable of writing to memories of the own server and the other servers of the plurality of servers, each of the plurality of servers mutually share memory maps in advance, wherein the processor of each of the plurality of servers is further caused to:

when receiving an access request, decide whether the own server is capable of processing the access request based on whether the access request is a read request or a write request and a storage location of the access request, when the own server is capable of processing the access request, the storage program executed at the processor of the own server performs the access request, when the access request is the read request from a host, the storage program executed at the processor of the own server reads the data of the data read request from the host from the memory of the own server, and when the access request is the read request transmitted by the storage program of an other server, a storage memory driver incorporated in the OS program executed at the processor of the own server reads the data of the data read request from the memory of the own server, when the access request is the read request and the storage location of the read request is the memory of another server of the plurality of servers:

the own server which received the read request acts as a request source server while the other server which is a target of the read request acts as a request destination server, the storage program executed at the processor of the request source server transmits a data read request to the request destination server, a storage memory driver incorporated in the OS program executed at the processor of the request destination server:
refers to the memory map of the request destination server itself and the memory map of the request source server,
determines a transfer amount in which data can be read from a continuous region of the memory of the request destination server and can be written in a continuous region of the memory of the request source server, and
repeatedly reads the data of the data read request from the memory of the request destination server and repeatedly writes the data to the memory of the request source server according to the transfer amount until the date read request is completed, and the storage program executed at the processor of the request source server reads the data from the memory of the request source server.

6. The computer system according to claim 2, wherein the processor of the request destination server is caused to:
determine whether or not the first address specified from the request source server is in an appropriate region and transmit an error response to the request source server in a case where the first address is not appropriate.

7. The computer system according to claim 1, wherein the storage program executed at the processor of the request source server transmits a request of atomically updating data to the request destination server, the storage memory driver incorporated in the OS program executed at the processor of the request destination server starts processing of atomically updating the requested data, and notifies an update completion response to the request source server, and the storage program executed at the processor of the request source server confirms the update completion.

8. The computer system according to claim 1, wherein the request source server includes a response storage region for each of the other servers, (a) each of the plurality of servers including the request source server and the request destination server mutually share memory maps,
the processor of the request source server is caused to:
(b) refer to the memory map of the request destination server, and specify a first address of the memory of the request destination server, by a storage process generated by execution of the storage program,
(c) transmit an interrupt of a request of reading the data of which first address is specified to the request destination server,
when the processor of the request destination server is caused to:
(d) receive the interrupt from the request source server, refer to the memory map of the request source server and specify a second address of the memory of the request source server in which data requested from the request source server is written,
(e) read data of the data read request from the first address of the request destination server and write the data of the data read request in the second address of the request source server, and
(f) store a response to the request in the response storage region corresponding to the request destination server, by the storage memory driver incorporated in the OS program, and
the request source server is caused to:
(g) detect the response stored in the response storage region by polling, and
(h) read the data from the second address of the memory of the request source server, by the storage process.

9. A processing method performed by a computer system including a plurality of servers connected to each other via a communication line, each of the plurality of servers has hardware including a memory and a processor, an OS program and a storage program being stored in the memory and the OS program and the storage program being executed by the processor, and
each of the plurality of servers is capable of reading the memory of an own server and capable of writing to memories of the own server and the other servers of the plurality of servers,
the processing method comprising:
when receiving an access request, deciding whether the own server is capable of processing the access request based on whether the access request is a read request or a write request and a storage location of the access request
when the own server is capable of processing the access request, performing the access request with the storage program of the own server, when the access request is the read request from a host, the storage program executed at the processor of the own server reads the data of the data read request from the host from the memory of the own server, and when the access request is the read request transmitted by the storage program of an other server, a storage memory driver incorporated in the OS program executed at the processor of the own server reads the data of the data read request from the memory of the own server,
when the access request is the read request and the storage location of the read request is the memory of another server of the plurality of servers:
the own server which received the read request acts as a request source server while the other server which is a target of the read request acts as a request destination server,
transmitting, by the storage program executed at the processor of the request source server, a data read request to the request destination server,
reading, by a storage memory driver incorporated in the OS program executed at the processor of the request destination server, the requested data transmitted by the storage program of the request source server from an own memory and writing the read data to the memory of the request source server, and
reading, by the storage program executed at the request source server, the data that has been read from the memory of the request destination server and written to the memory of the request source server from the memory of the request destination server.

* * * * *